W. M. SUMMERS.
ANIMAL STALL.
APPLICATION FILED JAN. 8, 1915.
1,150,315.
Patented Aug. 17, 1915.
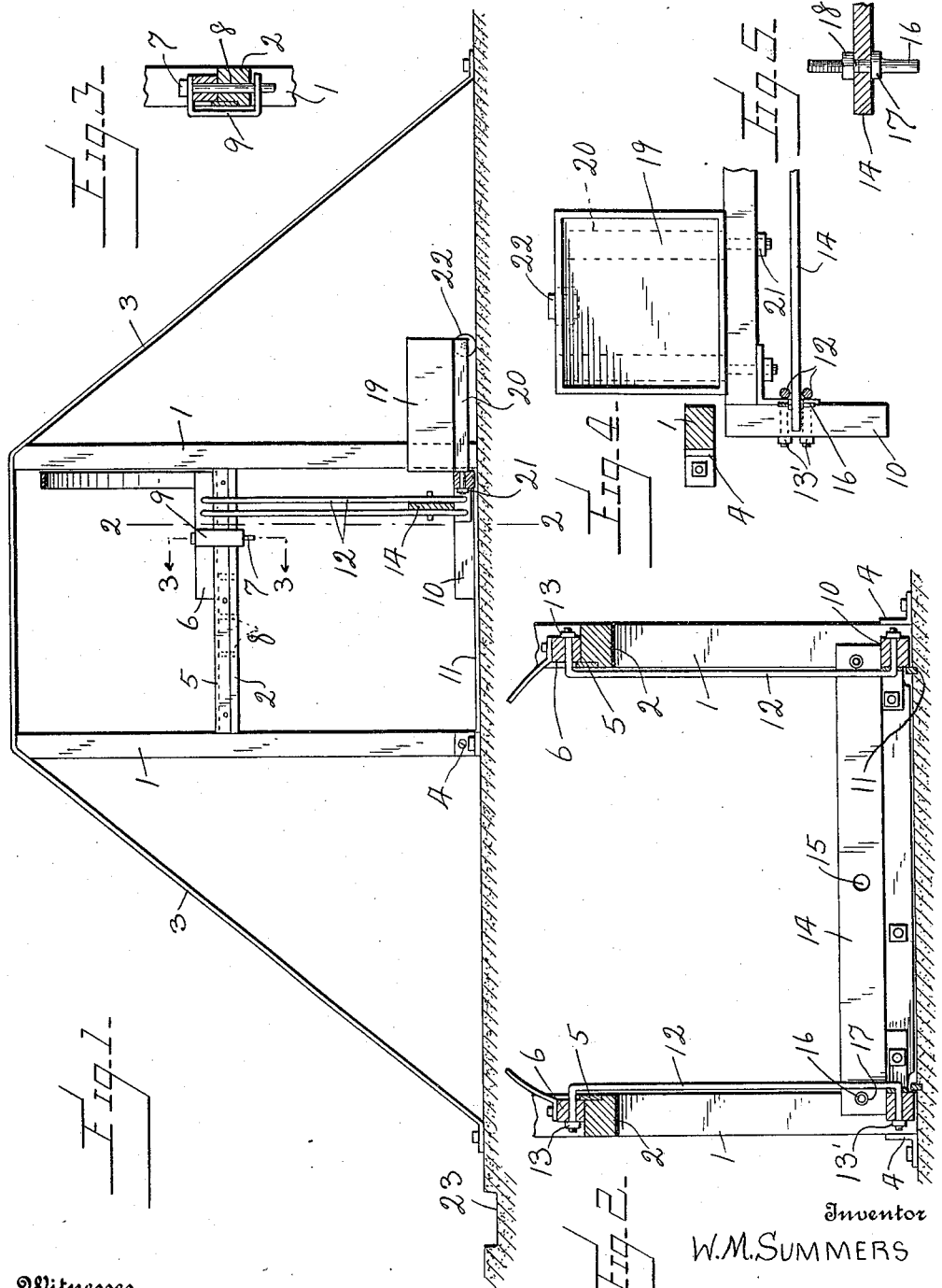
Witnesses
Geo. J. Heber
V. J. Dowrick
Inventor
W. M. SUMMERS
By Watson E. Coleman
Attorney

UNITED STATES PATENT OFFICE.

WILLIAM M. SUMMERS, OF PARIS, OREGON.

ANIMAL-STALL.

1,150,315.  Specification of Letters Patent.  Patented Aug. 17, 1915.

Application filed January 8, 1915. Serial No. 1,148.

*To all whom it may concern:*

Be it known that I, WILLIAM M. SUMMERS, a citizen of the United States, residing at Paris, in the county of Lane and State of Oregon, have invented certain new and useful Improvements in Animal-Stalls, of which the following is a specification, reference being had to the accompanying drawings.

This invention relates to new and useful improvements in animal stalls and more particularly to a stall which is especially adapted for use for securing cattle, the main object of the present invention being the provision of a stall having adjustable tying means and means whereby the feed box can be readily adjusted with the tying means so as to accommodate the stall to animals of various sizes.

Another object of the present invention is the provision of a stall of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referrred to and more particularly pointed out in the specification and claims.

In the accompanying drawing forming a part of this application, Figure 1 is a longitudinal sectional view of a stall constructed in accordance with my invention. Fig. 2 is a transverse sectional view taken on the line 2—2, Fig. 1. Fig. 3 is a transverse sectional view taken on the line 3—3, Fig. 1. Fig. 4 is a detail top plan view of the feed box, illustrating the mounting of the same; and Fig. 5 is a detail longitudinal sectional view of the tie board, illustrating the retaining bolt in position.

In the construction of my improved stall, I provide a frame which consists of the spaced uprights 1, suitably connected at their medial portions by means of the transverse bars 2 and are supported in position by means of the truss rods 3, preferably U-shaped and having their intermediate portions engaging the upper ends of the posts 1, while the ends thereof are bolted or otherwise secured to the floor of the stable. The upright posts 1 are further secured in position by means of the angular brace plates 4. Secured to the inner faces of the bars 2, are suitable plates 5 which form guides, the purpose of which will be hereinafter more fully set forth.

Slidably mounted upon the bars 2, are the movable bars 6, which are securely held in various adjusted positions by means of the bolts 7 which extend down through the bars 6 and into the openings 8 formed within the bars 2. From this it will be apparent that the movable bars 6 may be readily adjusted longitudinally upon the bars 2 and securely retained in an adjustable position. In order to retain the bars 6 against tilting movement, I provide a U-shaped clip 9, the ends of which are secured in position by means of the bolts 7. It will also be apparent that the plates 5 will retain the movable bars 6 against inward movement.

Movably mounted within the frame and arranged upon the floor, is a U-shaped frame 10, the ends of which are arranged parallel with the bars 2 and disposed behind the floor plates 11 which will assist in retaining the frame 10 in position. The frame 10 is connected to the bars 6 by means of the spaced rods 12 disposed upon opposite sides of the main frame and arranged in pairs, the upper ends of said rods being extended through the bars 6 and provided with nuts 13, for retaining the rods in position. The lower ends of the rods extend through the ends of the frame 10 and are provided with nuts 13' whereby to securely retain said rods in their operative positions.

Movably disposed within the main frame and having its ends slidably mounted between the rods 12, on opposite sides of the frame, is the tie board 14, the medial portion of which is provided with an opening 15 adapted for the reception of a rope or other suitable fastening means while the ends thereof are provided with transverse bolts 16 having an annular rib 17 adapted for engagement with one side of the board 14, while the other end of the bolt is threaded and a nut 18 is mounted thereon adapted for engagement with the opposite side of the board 14, whereby to securely retain the bolt 16 in position. It will be noted that when the tie board is arranged in place, the ends of the bolts will engage the rods 12 to retain the board in place. From this it will be apparent that any size animal may be tied to the board 14 and the animal can readily lie down without interfering with the tying means, as the board 14 will readily move up and down between the rods 12, to permit of a free movement of the animal.

Arranged directly in front of the movable frame 10, is the feed box 19 which is mounted upon supporting beams 20, the inner ends of which are bolted or otherwise secured to the medial portion of the frame 10 by means of the bolts 21, while the outer end of the box 19 is supported upon a roller 22, whereby the box may be readily moved with the frame 10. Formed within the floor of the stall and arranged at the rear of the stall, itself is a transverse gutter 23, the purpose of which is obvious.

From the foregoing taken in connection with the accompanying drawing, it will be apparent that I have provided a simple and durable stall for cattle and the like whereby different size cattle may be readily accommodated by the adjustment of the bars 6 and frame 10 and also by the movable tie bar 14. It will also be noted that the feed box may be readily moved with the adjustment of the tying means. The device itself may be constructed of wood, metal or any other desirable material and it will be noted that the same is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I desire to claim and secure by Letters Patent, is:—

1. A stall for cattle including a frame, means for supporting said frame in an upright position, spaced bars movable with respect to the frame, a U-shaped frame movable within the main frame, spaced rods connecting each of the movable bars with the U-shaped frame, a tie board having its ends movable between said rods, at opposite sides of the frame, and means for retaining said tie board in place.

2. A stall for cattle including a frame, means for supporting the same in an upright position, spaced bars movable with respect to the frame, a U-shaped frame movable within the main frame, spaced rods having one of their ends connected to the movable bars and their other ends connected to the side portions of the U-shaped frame and disposed in a vertical position, a tie board having its ends movably arranged between said rods, a transverse bolt extending through each end of the tie board for retaining the board in position between the rods.

3. A stall for cattle consisting of an upright frame, including cross bars provided with openings, spaced bars movable upon the cross bars and each provided with an opening, a bolt removably arranged within said openings to retain the movable bars in an adjusted position with respect to the stationary bars, a U-shaped frame movable with respect to the main frame, rods having one of their ends secured to the spaced bars and their other ends secured to the U-shaped frame, a tie board having its ends movably disposed between said rods, and means for retaining the ends of the tie board in position.

4. A stall for cattle including an upright frame, means for retaining said frame in position, a U-shaped frame movable with respect to the stationary frame, supporting beams connected with the U-shaped frame, a feed box carried thereby and movable therewith, and a supporting roller arranged at the outer end of the feed box, as and for the purpose set forth.

In testimony whereof I hereunto affix my signature in the presence of two witnesses.

WILLIAM M. SUMMERS.

Witnesses:
W. E. FENDALL,
BRYAN TOM.